United States Patent

Gross et al.

[11] Patent Number: 5,915,940
[45] Date of Patent: Jun. 29, 1999

[54] TIP-UP DEVICE WITH ADJUSTABLE SENSITIVITY

[76] Inventors: Raymond N. Gross, 228 East St.; Dennis J. Morin, 26 Dartmouth St., both of Easthampton, Mass. 01027

[21] Appl. No.: 09/009,778

[22] Filed: Jan. 20, 1998

[51] Int. Cl.⁶ .................................................. A01K 97/12
[52] U.S. Cl. ............................................................. 43/17
[58] Field of Search ...................................... 43/17

[56] References Cited

U.S. PATENT DOCUMENTS

| | | | |
|---|---|---|---|
| 2,114,529 | 4/1938 | Goodhue | 43/17 |
| 2,448,346 | 8/1948 | Baugh et al. | 43/17 |
| 2,502,231 | 3/1950 | Oberg | 43/17 |
| 2,575,156 | 11/1951 | Baugh et al. | 43/17 |
| 2,786,294 | 3/1957 | Whitacre | 43/17 |
| 2,908,100 | 10/1959 | Mogren | 43/17 |
| 5,448,849 | 9/1995 | Burgett | 43/17 |
| 5,564,213 | 10/1996 | Rinehart | 43/17 |

*Primary Examiner*—Thomas Price

[57] ABSTRACT

On an ice fishing tip-up which uses a bellcrank signal actuating mechanism, a device is used to adjust the line force required to actuate the signal by varying the interference between the bellcrank mechanism and an attached ramped tab which is stationary at the time of signal actuation.

1 Claim, 1 Drawing Sheet

TIP-UP DEVICE WITH ADJUSTABLE SENSITIVITY

CROSS-REFERENCES TO RELATED APPLICATIONS

Examination of class 43, subclass 17 has revealed two patents with related art: E. F. Mogren with U.S. Pat. No. 2,908,100 in July 1957 and W. V. Goodhue with U.S. Pat. No. 2,114,529 in February 1937.

BACKGROUND OF THE INVENTION

1. Technical Field

The subject invention relates to an improvement over existing ice fishing tip-up, signaling devices which are actuated by means of a bellcrank mechanism and allow the user to adjust the line force at which the signal flag is actuated.

2. Background Art

The subject invention differs from the invention of E. F. Mogren in many aspects. The subject invention has no tab motion at the time of signaling as does Mogren's retarding arm (item 45). Mogren does not use the bellcrank as a tensioner similar to the invention herein, but rather adds tensioning hardware which complicates the structure. Mogrens bellcrank travels in a set path and moves the tab or arm during signaling, whereas the tab of the invention herein remains stationary and deflects the bellcrank out of its normal path. Mogren makes his tension adjustment by tightening the pivot of his retarding arm. The invention herein has no pivot, and adjusts by moving the tab into the bellcrank thereby increasing the amount of interference. The methods of operation and adjustment of these two inventions are very different. The only similarity between Mogren's invention and the subject invention is interference of the bellcrank to adjust the signal actuation force.

W. V. Goodhue discloses a catch (item 44) which interferes with the ice fishing tip-up bellcrank mechanism in U.S. Pat. No. 2,114,529. The differences between the invention claimed herein and Goodhue's invention are numerous. Goodhue's catch does not interfere with the catch ramp at the time of signal actuation. Goodhue uses an additional spring to supply tension on the catch, whereas the subject invention cantilevers the existing bellcrank to provide tension. Goodhue's catch will always be used during the signaling process, whereas the subject invention may be moved clear of the bellcrank. The primary purpose of Goodhue's catch is not tention adjustment, and therefore lacks a significant adjustment range. Goodhue's catch is not installed in a manner which permits movement for adjustment. The subject invention can be adjusted from zero tension at the tab to completely locking the spool. Goodhue's adjustment is made by holding interference constant and changing leverage (column 3, line 43), whereas the invention herein relies on a change in interference only. There are substantial differences regarding the attachment, operation, and capabilities of the subject tab compared to Goodhue's catch.

SUMMARY OF THE INVENTION

The invention disclosed herein defines a means of adjusting signal actuation sensitivity on a typical ice fishing tip-up by securing the invention (e.g. a tab with a. ramp) to a fixed member of the tip-up (e.g. the main vertical support), with said ramped tab interfering with and resisting movement of the signal actuator. By moving the tab horizontally, the amount of interference between the bellcrank member and the tab is changed; thus adjusting the amount of force required to release the signal flag. More interference would require more line tension to force the bellcrank member by the ramped tab, which allows the signal flag to be released. The bellcrank wire acts as a cantilevered tensioner. This feature is desirable when using different sizes of bait for different sizes of catch. High signal actuation forces will not allow sensitive signaling for small catch, and low signal actuation forces will result in a false signal when using large bait.

DESCRIPTION OF THE PREFERRED EMBODIMENT

Figure 1:
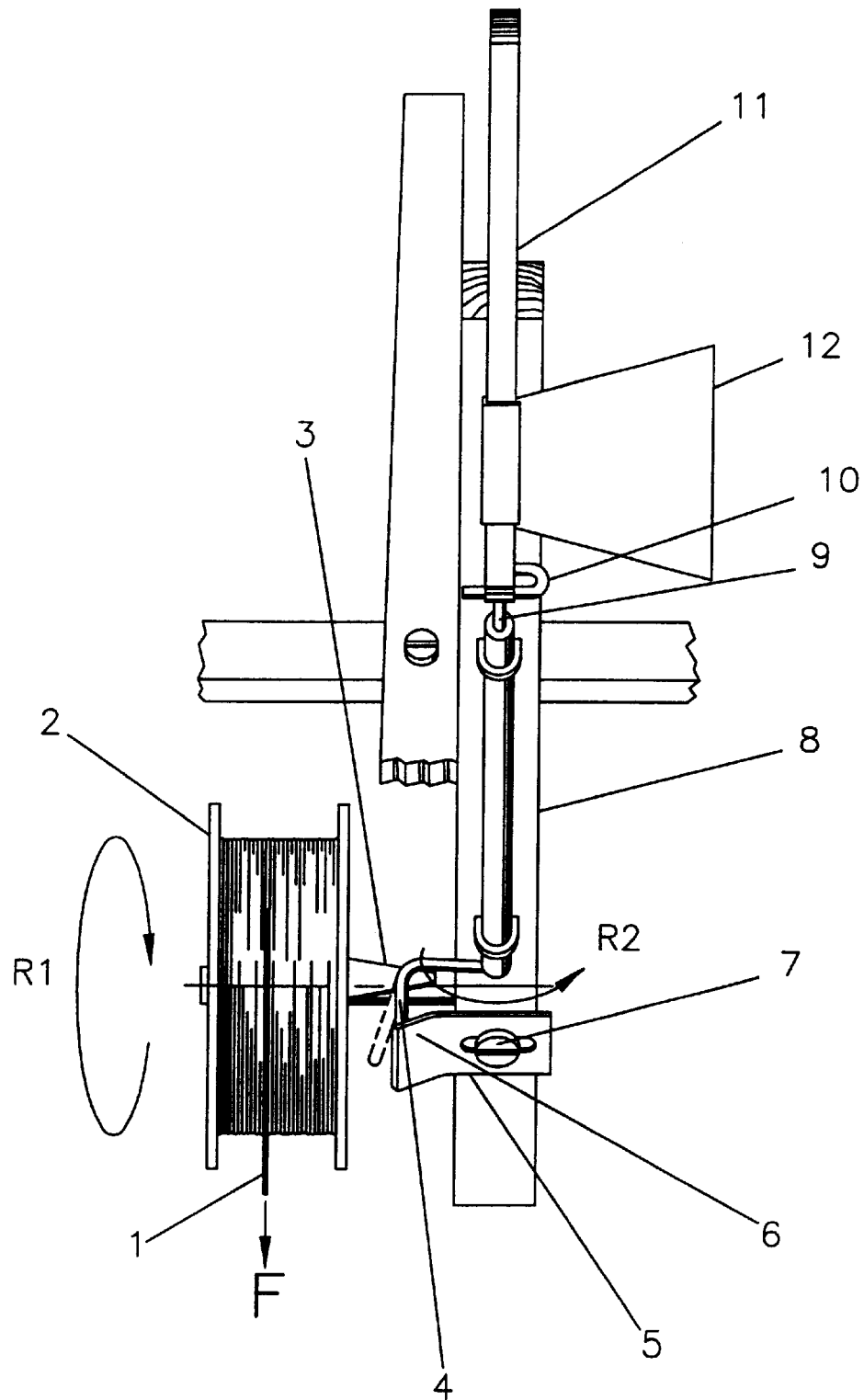
FIG. 1 is a drawing at a 45 degree angle which shows the Tip-up Device with Adjustable Sensitivity as it is installed on a typical ice fishing tip-up with a bellcrank signal actuating mechanism.

The line force required to actuate a signal flag on an ice fishing tip-up may be varied with the subject Tip-up Device with Adjustable Sensitivity as described below. FIG. 1 shows a typical ice fishing tip-up with a bellcrank signal actuating mechanism. Without the invention, a tug on the bait is signaled as follows: The tug causes a downward force on the fishing line 1 (indicated by arrow F) which rotates spool 2 (shown by R1) causing spool projection 3 to push against bellcrank actuator member 4. This force causes the bellcrank shaft to rotate (shown by R2) which, in turn, causes the bellcrank flag latch 10 to rotate and release the spring loaded flag mast 11, signaling a bite.

The signal release procedure utilizing the invention proceeds as follows: Force on line 1 tends to rotate spool 2 causing spool projection 3 to push against bellcrank actuator member 4. Rotation of the bellcrank shaft 9 is resisted when bellcrank member 4 contacts the tab 5 at ramp area 6. The line force increases until the ramp pushes bellcrank member 4 laterally as shown by dotted lines, causing the member to slide by the tab; thus allowing the bellcrank shaft to rotate and release flag mast 11. The line force required to actuate signal flag 12 may be increased by moving the tab 5 to the left; and conversely, the force may be decreased by moving the tab to the right.

The tab 5 is held to the main vertical support member 8 using a screw 7. The tab may be moved by providing a horozontal slot through the tab at screw 7. The invention may be constructed from various materials (steel, aluminum, plastic, etc.) and may be attached by various methods (screw, nail, staple, tangs, clamp, clip, etc).

Obviously this invention may be realized by several variations. It is not wished to be confined to details of construction, but rather define the invention as a novel application of existing art which provides a unique and desired result. The following claims will define the minimum art required to obtain the desired results.

The invention claimed is:

1. A fishing device comprising a bellcrank mechanism which actuates a signaling means and a ramp between a fixed member of said fishing device and said bellcrank mechanism, with said ramp interfering with said bellcrank mechanism to adjust the force required to actuate the signaling means, with said ramp stationary while said signaling means is actuated, with said ramp movable in a direction to substantially vary the interference force, and with said interference cantilevering the bellcrank member laterally outward.

* * * * *